(12) United States Patent
Yamazumi et al.

(10) Patent No.: US 6,305,694 B1
(45) Date of Patent: Oct. 23, 2001

(54) FERROFLUID SEALING DEVICE

(75) Inventors: Noboru Yamazumi, Asahi; Heiichi Unozawa, Chiba, both of (JP)

(73) Assignee: Ferrotec Corporation, Tokyo (JP)

( * ) Notice: Subject to any disclaimer, the term of this patent is extended or adjusted under 35 U.S.C. 154(b) by 0 days.

(21) Appl. No.: 09/444,086

(22) Filed: Nov. 22, 1999

(30) Foreign Application Priority Data

Nov. 26, 1998 (JP) .................................................. 10-009341

(51) Int. Cl.$^7$ ...................................................... F16J 15/43
(52) U.S. Cl. ............................................ 277/410; 384/133
(58) Field of Search .................................. 277/410, 411, 277/412; 384/133

(56) References Cited

U.S. PATENT DOCUMENTS

| | | | | |
|---|---|---|---|---|
| 4,357,022 | * | 11/1982 | Raj ........................................ | 277/410 |
| 4,357,024 | * | 11/1982 | Raj ........................................ | 277/410 |
| 4,386,784 | * | 6/1983 | Banks .................................... | 277/410 |
| 4,407,518 | * | 10/1983 | Moskowitz et al. .................. | 277/410 |
| 4,445,696 | * | 5/1984 | Raj et al. .............................. | 277/410 |
| 4,630,943 | * | 12/1986 | Stahl et al. ........................... | 384/133 |
| 5,108,198 | * | 4/1992 | Nii et al. ............................... | 384/133 |
| 5,165,701 | * | 11/1992 | Koba .................................... | 277/410 |
| 5,876,037 | * | 3/1999 | Ishizaki et al. ....................... | 277/410 |

FOREIGN PATENT DOCUMENTS

| | | | | |
|---|---|---|---|---|
| 2087988 | * | 6/1982 | (GB) . |
| 1-220777 | * | 9/1989 | (JP) . |
| 7-310746 | * | 11/1995 | (JP) . |
| 10-89490 | * | 4/1998 | (JP) . |
| 63-180774 | * | 7/1998 | (JP) . |

* cited by examiner

Primary Examiner—Anthony Knight
Assistant Examiner—Alison K. Pickard
(74) Attorney, Agent, or Firm—Flynn, Thiel, Boutell & Tanis, P.C.

(57) ABSTRACT

A ferrofluid sealing device retaining a ferrofluid between a shaft and a pair of inner and outer pole pieces rotating in opposite directions, in which grooves are formed on a shaft surface that faces the inner diameter surfaces of pole pieces. In the sealing device, one of the pole pieces may be made thicker than the other and further a projection portion can be formed on the shaft surface facing the inner peripheral faces of the pole pieces. The sealing device can prevent, even when the ferrofluid seal is operated at a higher rotation speed, splashing of ferrofluid over the surroundings, thereby avoiding staining the surroundings as well as prolonging its lifetime.

2 Claims, 4 Drawing Sheets

FERROFLUID SEALING DEVICE

BACKGROUND OF THE INVENTION

1. Field of the Invention

The present invention relates to improvement of a ferrofluid sealing device for use in, e.g., a spindle motor that drives a magnetic recording medium utilized in the information industry.

2. Description of the Prior Art

A conventional ferrofluid sealing device is constructed as shown in FIG. 7. That is, a pair of pole pieces 1, 2 made of magnetic bodies, each having a shape of a doughnut-like disk, sandwiched between their inner surfaces is a magnet 3 shaped into a doughnut-like disk and having an inner diameter larger than that of either of the pole pieces; the outer peripheral faces thereof are fixed to a housing 6; a shaft 7 made of a magnetic body is inserted to the center holes of the doughnut-like pole pieces; and a ferrofluid (a magnetic fluid) 5 is retained, by a magnetic circuit formed by the magnet 3, in a gap between this shaft 7 and a front end surface 4 of the outer pole piece 1 facing the shaft and located on the side where the ferrofluid is retained. Reference numeral 8 denotes a ball bearing.

In the ferrofluid sealing device described above, not all of the magnetic flux generated by the magnet 3 can flow from the pole pieces 1, 2 to the shaft 7. Some of the magnetic flux leaks when it flows from the vicinity of the inner diameters of the pole pieces 1,2 to the shaft 7, causing the ferrofluid 5, which is injected to and retained in the gap between the shaft and the pole pieces 1, 2, to have a shape bulging axially from the shaft toward the pole piece 1. The bulging ferrofluid splashes outward upon high-speed rotation of the seal device, which brings about inconveniences such as shortened lifetime due to reduction in amount of the ferrofluid 5, or stained surroundings due to the ferrofluid 5 flowing out onto the outer surface of the pole piece 1.

SUMMARY OF THE INVENTION

The present invention solves such problems encountered in the prior art, and provides a high-speed rotation ferrofluid sealing device that can prevent, even when the ferrofluid seal is operated at a higher rotation speed, splashing of ferrofluid over the surroundings, thereby avoiding staining the surroundings as well as prolonging its lifetime.

A first aspect of the present invention is a ferrofluid sealing device retaining a ferrofluid between a shaft and inner and outer pole pieces rotating in opposite directions, wherein grooves are formed on a shaft surface that faces inner diameter surfaces of the pole pieces.

In the above sealing device, the grooves are preferably formed at an outer position shortly from a front end of the outer pole piece on the side where the ferrofluid is retained, and at an inner position shortly from the front end of the outer pole piece; and a projection portion wider than the thickness of an end surface of the outer pole piece is formed between the grooves. More specifically, the grooves formed on the shaft surface are effective when located at a position about 0.05 mm high from the upper surface of the outer pole piece and at a position about 0.05 mm below the lower surface of the outer pole piece. Providing these grooves can cut down the leakage of magnetic flux toward the outer surface side of the outer pole piece, as well as heighten the density of the magnetic flux in a gap between the shaft and the pole piece. Therefore, the ferrofluid does not splash even in high-speed rotation, showing enough sealing effect.

A second aspect of the present invention is a ferrofluid sealing device retaining a ferrofluid between a shaft and inner and outer pole pieces rotating in opposite directions, wherein the outer pole piece on the side where the ferrofluid is retained is 1.5 to 18.0 times as thick as the opposite inner pole piece.

The outer pole piece may be thicker than the opposite inner pole piece along its full length, or only at the inner circumferential portion beyond a stepped portion for supporting a magnet. The stepped portion may be formed on both the inside and outside the outer pole piece or only on the inside.

Thus, making the outer pole piece thicker can increase the magnetic flux and suppress the leakage of magnetic flux toward the outer surface side, presenting an effect equal to that of the formation of the grooves describedabove. The range between 1.5 times and 18.0 times is determined as a result of many tests. Also, the contact area between the ferrofluid and the pole piece is increased, so that the resistance value is lowered improving ground effect for grounding static electricity.

A third aspect of the present invention is a ferrofluid sealing device retaining a ferrofluid between a shaft and inner and outer pole pieces rotating in opposite directions, wherein grooves are formed on a shaft surface that faces inner diameter surfaces of the pole pieces, and the outer pole piece on the side where the ferrofluid is retained is 1.5 to 18.0 times as thick as the opposite inner pole piece.

Employing together the structures of the first and second aspects above makes it possible to further cut down the leakage of magnetic flux and, accordingly, show the above effect.

A fourth aspect of the present invention is a ferrofluid sealing device retaining a ferrofluid between a shaft and inner and outer pole pieces rotating in opposite directions, wherein the outer pole piece on the side where the ferrofluid is retained is 1.5 to 18.0 times as thick as the inner pole piece, and a projection portion with a width narrower than the thickness of the outer pole piece on the side where the ferrofluid side is retained is formed on a shaft surface that faces an inner diameter surface of the outer pole piece.

The magnetic flux density in a gap between the pole pieces and the shaft can be heightened also with such a structure. Thus, the ferrofluid does not splash even in high-speed rotation, showing enough sealing effect.

DETAILED DESCRIPTION OF THE PREFERRED EMBODIMENTS

Embodiment modes of the present invention are described with reference to the drawings.

Figure 1:
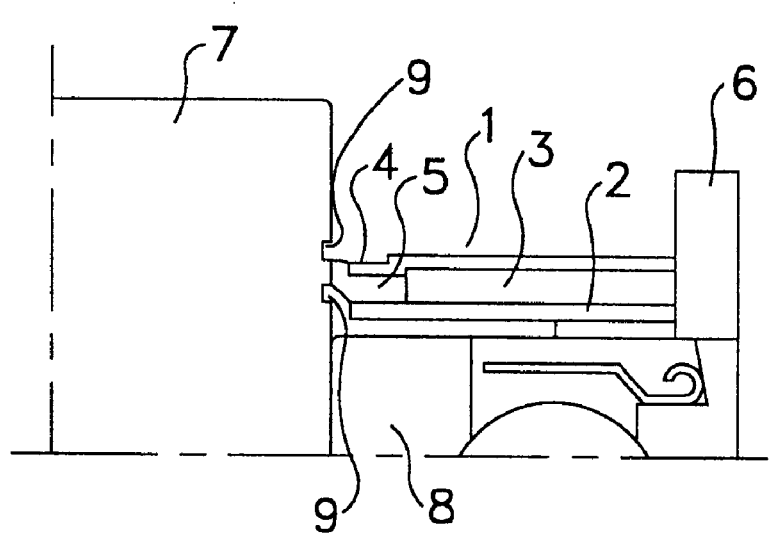
FIG. 1 is a sectional view of the main part according to Embodiment 1 of the present invention.
Figure 7:
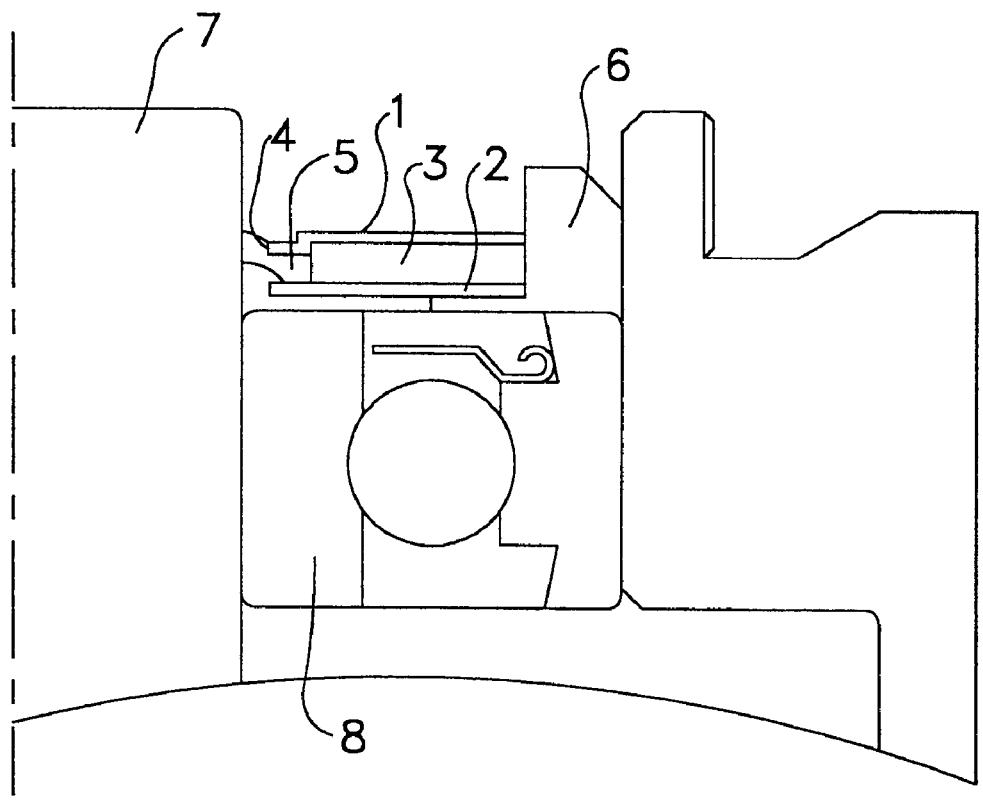
FIG. 7 is a sectional view of the main part according to a conventional example.

FIG. 1 shows an example of the invention the basic structure of which is the same as the one in FIG. 7 described in the Prior Art. Therefore, parts having the same names as in FIG. 7 are denoted by the same reference numerals. Two grooves 9, 9 each having a depth of about 0.05 mm are formed on a surface of a shaft 7 which faces an outer pole piece 1 and an inner pole piece 2: one is at a position about 0.05 mm high from the upper surface of the outer pole piece 1, and the other is about 0.05 mm below the lower surface of the outer pole piece 1. This can cut down the leakage of magnetic flux upward the outer pole piece 1 in the drawing, as well as heighten the magnetic flux density in a gap between the outer pole piece 1 and the shaft 7.

Figure 2:
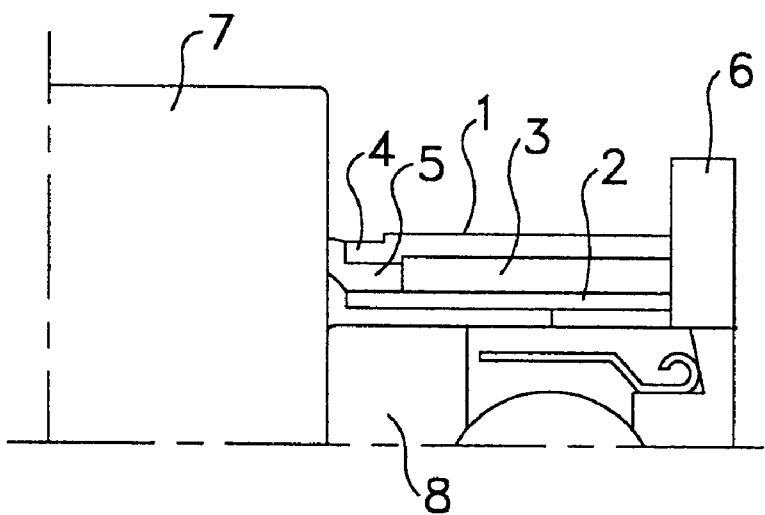
FIG. 2 is a sectional view of the main part according to Embodiment 2 of the present invention.
Figure 3:
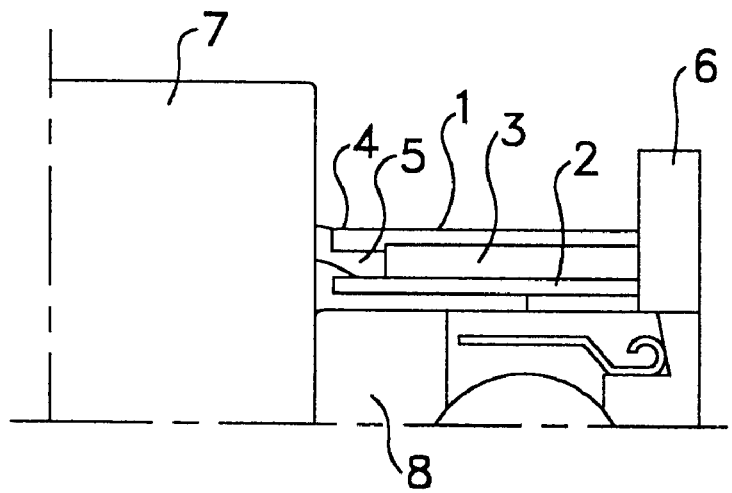
FIG. 3 is a sectional view of the main part according to Embodiment 3 of the present invention.

In FIGS. 2 and 3, the thickness of the outer pole piece 1 on the upper side in the drawing is thicker than that of the inner pole piece 2 on the lower side. For instance, the outer pole piece has a thickness of 0.15 to 1.8 mm while the inner pole piece thickness is 0.1 mm. In the case of FIG. 2, the thickness is increased throughout the entire length of the pole piece 1. On the other hand, in the case of FIG. 3, the thickness is increased only at the front end portion beyond a stepped portion for supporting a magnet 3. The leakage of magnetic flux upward in the drawing can be cut down in either case.

Figure 4:
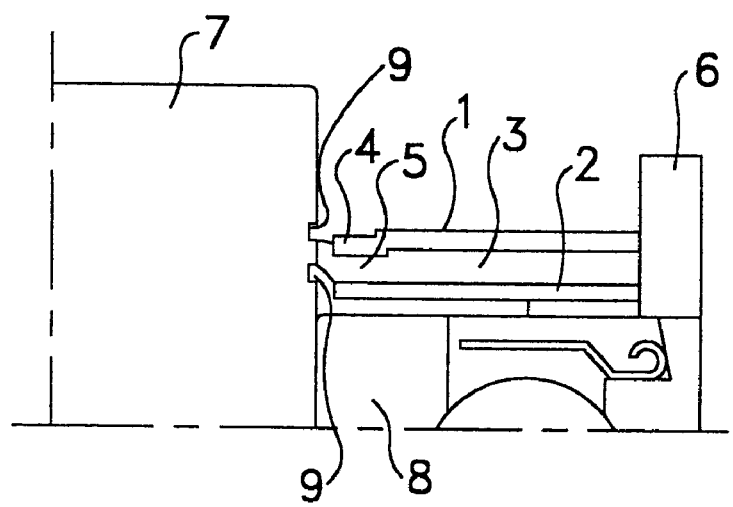
FIG. 4 is a sectional view of the main part according to embodiment 4 of the present invention.
Figure 5:
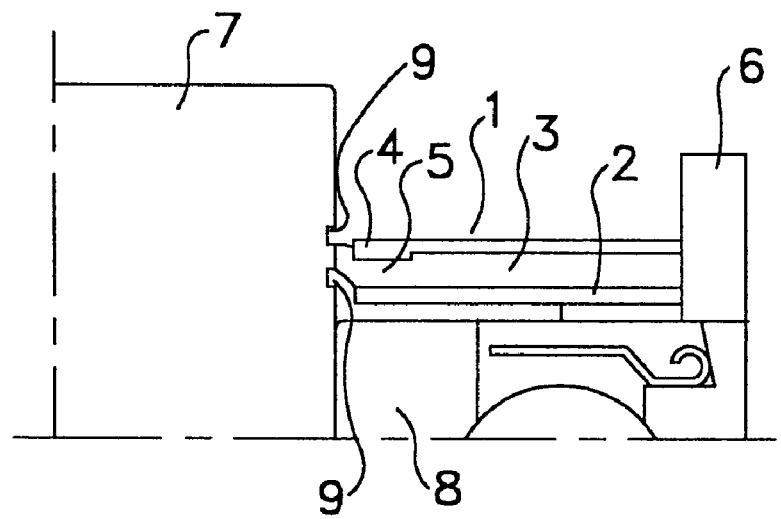
FIG. 5 is a sectional view of the main part according to embodiment 5 of the present invention.

In FIGS. 4 and 5, the structures of FIGS. 2 and 3 are employed, respectively, together with the grooves 9 in FIG. 1.

Figure 6:
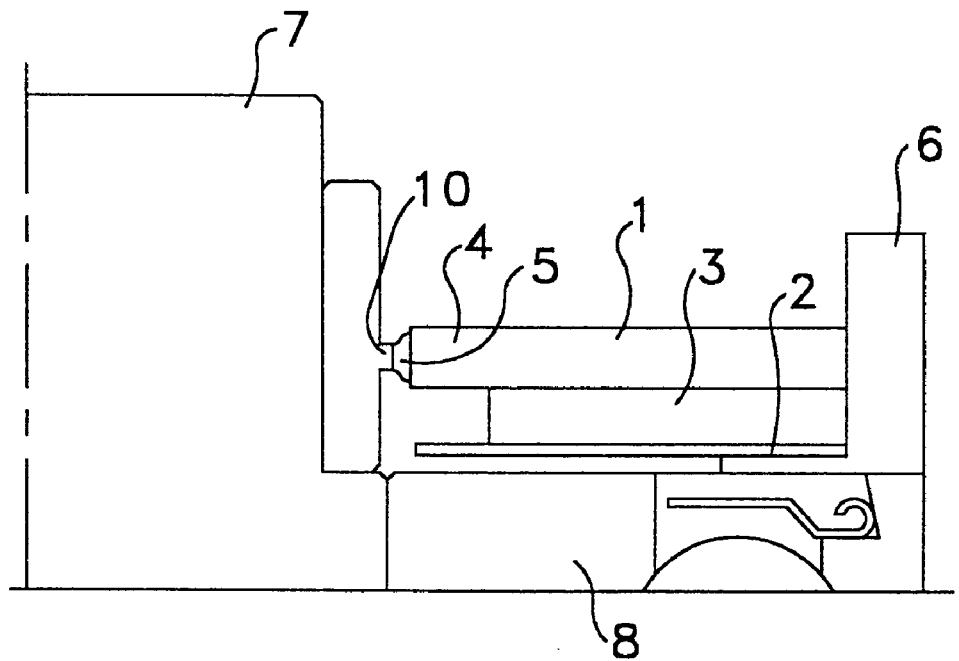
FIG. 6 is a sectional view of the main part according to embodiment 6 of the present invention.

In FIG. 6, a projection portion 10 with a width narrower than the thickness of a front end portion 4 of the outer pole piece 1 is formed on the shaft side. The leakage of magnetic flux upward in the drawing can be cut down in either case.

By forming the grooves in the shaft, according to the above-mentioned first aspect, or by making one of the pole pieces thicker than the other, according to the second aspect, or by combining the structures in the first aspect and the second aspect, according to the third aspect, or by forming the projection portion. On the shaft, according to the fourth aspect, the magnetic flux generated by the magnet can be controlled. This prevents the leakage of magnetic flux, diminishes the axial bulging of the ferrofluid, and avoids outward splashing of the fluid to show enough sealing effect, preventing staining the surroundings and prolonging the lifetime. In addition, the contact area between the ferrofluid and the pole pieces is increased to improve ground effect for grounding static electricity.

What is claimed is:

1. A ferrofluid sealing device retaining a ferrofluid between a shaft and inner and outer pole pieces rotating in opposite directions, wherein grooves are formed on a shaft surface that faces inner diameter surfaces of the pole pieces, and the outer pole piece on the side where the ferrofluid is retained is 1.5 to 18.0 times as thick as the inner pole piece, wherein the grooves are formed at an outer position adjacent a front end of the outer pole piece on a side where the ferrofluid is retained and an inner position adjacent the front end of the outer pole piece and a projection portion, which is wider than the thickness of an end surface of the outer pole piece, is formed between the grooves.

2. A ferrofluid sealing device which retains a ferrofluid between a shaft and inner and outer pole pieces rotating in opposite direction, wherein grooves are formed on a shaft surface that faces inner diameter surfaces of the pole pieces at an outer position adjacent a front end of the outer pole piece on a side where the ferrofluid is retained and an inner position adjacent front end of the outer pole piece and a projection portion, which is wider than the thickness of an end surface of the outer pole piece, is formed between the grooves.

* * * * *

UNITED STATES PATENT AND TRADEMARK OFFICE
CERTIFICATE OF CORRECTION

PATENT NO. : 6,305,694 B1
DATED : October 23, 2001
INVENTOR(S) : Noboru Yamazumi et al.

It is certified that error appears in the above-identified patent and that said Letters Patent is hereby corrected as shown below:

<u>Column 4,</u>
Line 30, change "position adjacent front end" to -- position adjacent a front end --.

Signed and Sealed this

Thirtieth Day of April, 2002

Attest:

JAMES E. ROGAN
*Attesting Officer*　　*Director of the United States Patent and Trademark Office*